United States Patent [19]
Kotick et al.

[11] 3,905,953
[45] Sept. 16, 1975

[54] POLY-5-HALOGENO-2'-HALOGENO-2'-DEOXYURIDYLIC ACIDS

[75] Inventors: Michael Paul Kotick, Elkhart; Chimanbhai P. Patel, Mishawaka; Joseph L. Colbourn, Elkhart; Robert J. Erickson, Elkhart, all of Ind.

[73] Assignee: Miles Laboratories, Inc., Elkhart, Ind.

[22] Filed: Dec. 6, 1973

[21] Appl. No.: 422,403

[52] U.S. Cl. .......................... 260/211.5 R; 424/180
[51] Int. Cl.² ........................................ C07H 19/10
[58] Field of Search ............................ 260/211.5 R

[56] References Cited
UNITED STATES PATENTS

| | | | |
|---|---|---|---|
| 3,687,931 | 8/1972 | Verheyden et al. | 260/211.5 R |
| 3,792,039 | 2/1974 | Erickson et al. | 260/211.5 R |

*Primary Examiner*—Johnnie R. Brown
*Attorney, Agent, or Firm*—Myron B. Sokolowski

[57] ABSTRACT

Poly-5-halogeno-2'-halogeno-2'-deoxyuridylic acids in which the 5-halogeno substituent is fluoro, chloro, bromo, or iodo and the 2'-halogeno group is fluoro, chloro, or bromo are useful as inhibitors of avian myeloblastosis virus RNA-dependent DNA polymerase.

13 Claims, No Drawings

POLY-5-HALOGENO-2'-HALOGENO-2'-DEOXYURIDYLIC ACIDS

BACKGROUND OF THE INVENTION

Description of the Prior Art

The following polynucleotides have been reported in the literature:

poly-2'-fluoro-2'-deoxyuridylic acid [Janik, et al., Biochem. Biophys. Res. Commun., 46: 1153 (1972)];

poly-2'-fluoro-2'-deoxycytidylic acid [Hendler, et al., Abstracts, 162nd National Meeting, American Chemical Society, Sept. 1971 Abstract No. Biol. 20];

poly-2'-chloro-2'-deoxy- uridylic and cytidylic acids [Hobbs, et al., Biochemistry, 11: 4336 (1972)];

poly-2'-azido-2'-deoxyuridylic acid [Torrence, et al., Biochemistry, 12: 3962 (1973)]; and poly-2'-amino-2'-deoxyuridylic acid [Hobbs, et al., Biochem. Biophys. Res. Commun., 46: 1509 (1972)].

Several 2'-0-methylated or 2'-0-ethylated pyrimidine and purine polynucleotides have been reported as have certain 2'-0-acetyl polynucleotides. To date, the only altered synthetic polynucleotide which has been demonstrated to be an inhibitor of reverse transcriptase, aside from the work reported by Erickson et al., has been by poly-2'-0-methyl adenylic acid [Tennant, Kenney, Tuominen, Nature New Biology, 238: 51 (1972)].

SUMMARY OF THE INVENTION

The subject matter of this invention involves certain oligo- and poly-5-halogeno-2'-halogeno-2'-deoxyuridylic acids which are polymerized by enzymatic catalysis from corresponding 5-halogeno-2'-halogeno-2'-deoxyuridine diphosphates. In the monomer and polymer, the 5-halogeno substituent is fluoro, chloro, bromo, or iodo, and the 2'-halogeno group is fluoro, chloro, or bromo.

Specifically, this invention pertains to compounds having the formula (I)

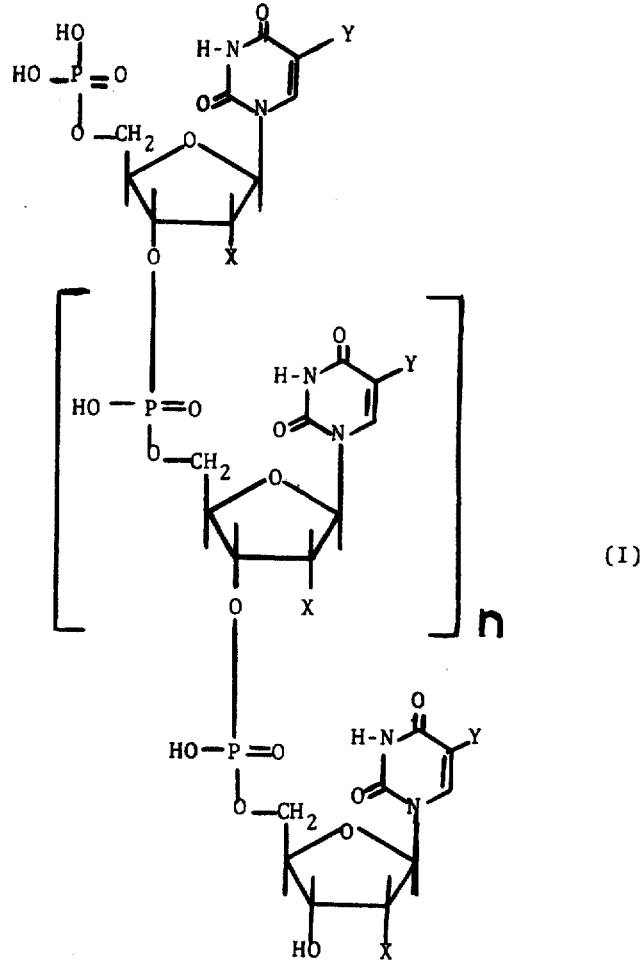

(I)

in which: Y is fluoro, chloro, bromo, or iodo; X is fluoro, chloro, or bromo; and n is an integer having a value of from zero to infinity. In the case where $n$ has the value of zero, I represents di-5-halogeno-2'-halogeno-2'-deoxy-5'-uridylic acid.

Specific examples of compounds represented by (I) include the following:

1. poly-5-fluoro-2'-fluoro-2'-deoxyuridylic acid.
2. poly-5-fluoro-2'-chloro-2'-deoxyuridylic acid.
3. poly-5-fluoro-2'-bromo-2'-deoxyuridylic acid.
4. poly-5-chloro-2'-fluoro-2'-deoxyuridylic acid.
5. poly-5-chloro-2'-chloro-2'-deoxyuridylic acid.
6. poly-5-chloro-2'-bromo-2'-deoxyuridylic acid.
7. poly-5-bromo-2'-fluoro-2'-deoxyuridylic acid.
8. poly-5-bromo-2'-chloro-2'-deoxyuridylic acid.
9. poly-5-bromo-2'-bromo-2'-deoxyuridylic acid.
10. poly-5-iodo-2'-fluoro-2'-deoxyuridylic acid.
11. poly-5-iodo-2'-chloro-2'-deoxyuridylic acid.

12. poly-5-iodo-2'-bromo-2'-deoxyuridylic acid.

The oligo- and poly-nucleotides represented by (I) are prepared by enzymatic catalysis from corresponding uridine-5'-diphosphates having the formula

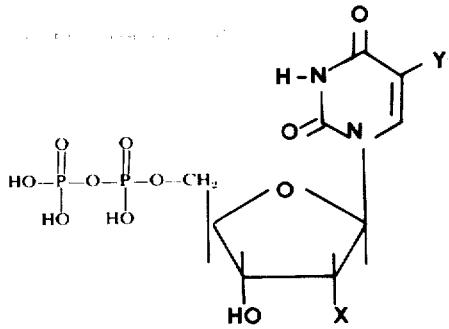

(II)

in which X and Y are halogeno substituents as defined in Formula (I). Specifically, polymerization of the substrate uridine-5'-diphosphates, (II), is effected with polynucleotide phosphorylase, which was prepared from *Escherichia coli* by modifications of standard methods (Williams and Grunberg-Manago, Eur. J. Biochem., 12: 236 [1970]; Kimhi and Littauer, J. Biol. Chem., 243: 231 [1968]). The resulting polymers are purified by a combination of chromatography and dialysis to obtain white hygroscopic solids.

The uridine-5'-diphosphates, (II), are prepared from corresponding 5-halogeno-2'-halogeno-2'-deoxyuridines having the formula (III)

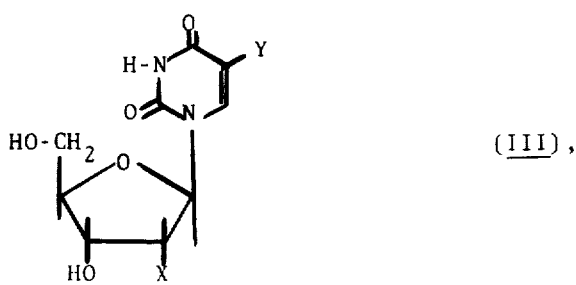

(III), in which the X and Y substituents have the same meaning as defined in Formula (I). Compounds (III) in turn are prepared according to the following reaction sequence.

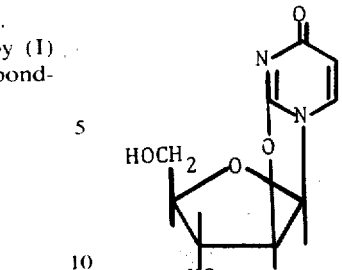

(IV)

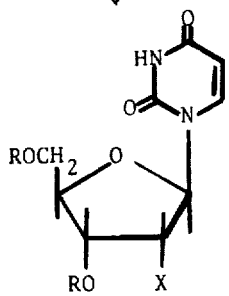

(V)

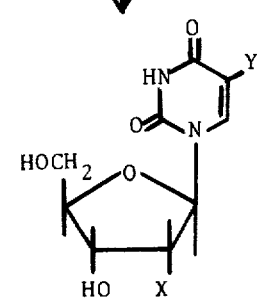

(III)

In the above series of reactions, X and Y are groups as defined above for Formula (I).

The synthesis of 2,2'-anhydro-1-($\beta$-D-arabinofuranosyl) uracil (Formula IV) and its conversion to 2'-halogeno-2'-deoxyuridine substituted at either the 5' or 4' position (Formula V) can be performed according to published methods (Codington et al., J. Org. Chem., 29: 558 [1964]; Codington et al., J. Org. Chem., 29: 564 [1974]; Doerr et al., J. Org. Chem., 32: 1462 [1967]; and Cushley et al., Can. J. Chem., 46: 1131 [1968]). The 2'-fluoro-2'-deoxycytidine analogues of Formula (II), however, were prepared by the procedure of Hendler and co-workers (Abstracts, 162nd National Meeting of the American Chemical Society, Sept. 1971, No. Biol. 20) or of Shannahoff and Sanchez (J. Org. Chem., 38: 593 [1973]).

The conversion of Formula (V) to Formula (III) can be accomplished by the following methods: the 5-fluoro analogues were prepared according to the reaction described by Robins and Naik (J. Amer. Chem. Soc., 93: 5277 [1971]; Chem. Comm., 18: [1972]); 5-chloro and 5-bromo derivatives were made by the pathway described by Fukuhyana and Visser (J. Biol. Chem., 190: 95 [1951]); and 5-iodo compounds were synthesized according to Prusoff et al., (Cancer Res., 13: 221 [1953]; Biochem. Biophys. Acta, 32: 295 [1959]).

Compounds represented by Formula (I) are useful as inhibitors of the RNA-dependent DNA polyermase of oncogenic RNA tumor viruses. For example, poly-5-bromo-2'-chloro-2'-deoxyuridylic acid and poly-5-chloro-2'-chloro-2'-deoxyuridylic acids are approximately twice as potent with regard to inhibition of the RNA-dependent DNA polymerase derived from avian myeloblastosis virus (AMV) than poly-2'-fluoro-2'-deoxyuridylic acid (Janik et al., Biochem. Biophys. Res. Comm., 46: 1153 [1972]).

Compounds represented by Formula (II) are useful in the preparation of the oligo- and poly-5-halogeno-2'-halogeno-2'-deoxyuridylic acids, (I).

DESCRIPTION OF THE PREFERRED EMBODIMENTS

EXAMPLES 1–12

5-Halogeno-2'-Halogeno-2'-Deoxyuridine-5'-Diphosphates

A mixture of between 2.4 and 3.2 ml of trimethyl phosphate and between 0.65 to 1.2 ml (7 mmoles to 13 mmoles) of distilled phosphorous oxychloride was stirred under anhydrous conditions in an ice-bath for 15 minutes. To the cooled, stirred mixture was added the appropriate nucleoside (1 mmole) in a single portion. The nucleoside dissolved after stirring for a short time, and stirring under anhydrous conditions was continued at ice-bath temperature for 6 hours. The reaction mixture was then poured over 20 g of crushed ice, and the resulting solution was stirred with cooling in an ice-bath for 30 minutes. To the cooled, stirred mixture was then added, in equimolar proportion to the phosphorous oxychloride used above, magnesium acetate tetrahydrate (1.50 g. to 2.79 g, 7 mmoles to 13 mmoles). The cold reaction mixture was then made basic by the addition of concentrated ammonium hydroxide until the pH was stabilized at about pH 8 (moist pH paper). Stirring and cooling of the mixture was continued for 30 minutes in the ice-bath after which the insoluble $Mg(NH_4)-PO_4 \cdot xH_2O$ was removed by filtration and washed with water adjusted to pH 8 by the addition of ammonium hydroxide. The combined filtrate and washings were passed through a column of an acidic ion-exchange resin (Dowex 50 − H +, X 4 or X 8, approximately 100 ml volume) and the ultraviolet absorbing, acidic portion of the eluant collected. The column was washed with water to remove all the ultraviolet absorbing material. The combined eluants were then evaporated in vacuo at about 45° to 50° to a thick syrup. The syrup was azeotroped several times with water and finally was dissolved in methanol (20 ml) and tri-n-butylamine (0.25 ml, 1 mmole) added. The methanolic solution was evaporated to dryness, dissolved in dimethylformamide (DMF) (20 ml) and the solution concentrated in high vacuum at 45° to 50° to a small volume. The residue was azeotroped with three 30 ml portions of dry DMF (distilled in vacuo and kept over 4A Molecular Sieve). The residue was finally dissolved in DMF (20 ml) and to the clear, stirred solution was added 1,1'-carbonyldiimidazole (324 mg, 2 mmole). The mixture was stirred at room temperature under anhydrous conditions. After 30 minutes, an anhydrous solution of mono-tri-n-butyl ammonium phosphate (4 mmole) in DMF (10 to 15 ml) was added and the reaction mixture stirred under anhydrous conditions overnight at room temperature (16 to 20 hours). The reaction solution was decanted from some insoluble gummy material or clarified by filtration, the gum or collected insoluble material in each case being extracted or washed with additional quantities of DMF. The combined DMF solution containing the product was evaporated under high vacuum at 45° to 50° to a small volume and the residual material taken up in water (50 to 100 ml). The aqueous solution containing the desired nucleotide-5'-diphosphate was fractionated on an ion-exchange column (DEAE-Sephadex-A-25, bicarbonate form, 150 ml volume) using a linear gradient consisting of 4 L of water in the mixing chamber and 4 L of 0.5 M triethylammonium bicarbonate (pH 7.4–7.8) in the buffer chamber. The major, well resolved, optical density peak containing the diphosphate was concentrated to a small volume and then freeze dried to give the tri-triethylammonium salt of the nucleotide as a foam. The nucleoside-5'-diphosphate so obtained migrated as a single homogeneous spot on thin layer chromatography using cellulose plates with a fluorescence indicator and a solvent system consisting of isobutyric acid-water-concentrated ammonium hydroxide - 0.05 M EDTA (100-56-4-3.2 v/v) or on a cellulose MN 300 polyethyleneimine impregnated with fluorescence indicator (Brinkman Instruments Polygram Cek 300 PE1/UV254) using various concentrations of aqueous LiCl as the developing solvent (0.2 - 0.8 M). The following 5-halogeno-2'-halogeno-2'-deoxyuridine-5'-diphosphates were prepared in the above manner:

| Tri-triethylammonium Salt of nucleoside 5'-diphosphate | Molecular Weight of Triethyl-ammonium Salt | O.D. Units of nucleotide obtained |
|---|---|---|
| 1) 5-Fluoro-2'-fluoro-2'-deoxyuridine | 727 | 1788 |
| 2) 5-Chloro-2'-chloro-2'-deoxyuridine | 760 | 2925 |
| 3) 5-Bromo-2'-chloro-2'-deoxyuridine | 804 | 2634 |
| 4) 5-Iodo-2'-chloro-2'-deoxyuridine | 851 | 1750 |

The following 5-halogeno-2'-halogeno-2'-deoxyuridine-5'-diphosphates (Examples 5-12) are prepared in a similar manner.

5) 5-fluoro-2'-chloro-2'-deoxyuridine-5'-diphosphate.
6) 5-fluoro-2'-bromo-2'-deoxyuridine-5'-diphosphate.
7) 5-chloro-2'-fluoro-2'-deoxyuridine-5'-diphosphate.
8) 5-chloro-2'-bromo-2'-deoxyuridine-5'-diphosphate.
9) 5-bromo-2'-fluoro-2'-deoxyuridine-5'-diphosphate.
10) 5-bromo-2'-bromo-2'-deoxyuridine-5'-diphosphate.
11) 5-iodo-2'-fluoro-2'-deoxyuridine-5'-diphosphate.
12) 5-iodo-2'-iodo-2'-deoxyuridine-5'-diphosphate.

EXAMPLES 13–24

Poly-5-Halogeno-2'-Halogeno-2'-Deoxyuridylic Acids

13. Poly-5-Bromo-2'-Chloro-2'-Deoxyuridylic Acid
   Polymerization of the substrate nucleoside-5'- diphosphate was accomplished with polynucleotide phosphorylase which was prepared from *Escherichia coli*. The reaction vessel contained in a total volume of 10 ml, 0.1 M Tris buffer pH 9.0, 4 mM $MnCl_2$, 97 μmoles of the substrate and the enzyme at a concentration of 100 units/ml. The mixture was incubated at 37° and the extent of reaction followed by measurement of the release of inorganic phosphate. After 48 hours at 37°, the reaction was terminated by the addition of 0.4 ml of 0.2 M EDTA to the reaction vessel. The reaction mixture was then applied to two chromatographic columns in series, 2.5 cm × 90 cm each containing Sephadex G-50, and the columns were developed with a solvent consisting of 0.2 M NaCl and 1 mM EDTA. The polymeric material eluted with the void volume. The pooled eluant (40 ml) containing the polymeric material was dialyzed against 0.2 M NaCl and 1 mM EDTA. This fraction was then deproteinized in the following manner:

Sufficient 1 M Tris buffer pH 9.0 was added to make the solution 0.01 M with regard to the buffer. This solution was mixed with an equal volume of phenol previously saturated with a mixture of 0.01 M pH 9.0 Tris buffer and 0.1 M NaCl. The mixture was shaken for 5 to 10 mins. and the emulsion which formed broken by low speed centrifugation, if necessary. The phenol layer was again extracted with an equal volume of 0.01 M Tris buffer pH 9.0–0.1 M NaCl. The combined aqueous layers after deproteinization were exhaustively dialyzed against water and the solution remaining in the dialysis tubing freeze dried. The residual material, 36 optical density units (A 277), was relyophilized. Poly-5-bromo-2'-chloro-2'-deoxyuridylic acid obtained in this manner had the following characteristics: $S_{20}$, 12.7 in a solution containing 1 M NaCl-phosphate buffer, pH 7.1 of ionic strength 0.05; $A_{max}$ 276.5 nm at pH 7 to pH 4; $E_{276.5}$ nm = 7,700 in a solution containing 0.1 M NaCl - phosphate buffer, pH 7.0 of ionic strength = 0.05, based on phosphorus analysis of an aqueous solution of the polymer and an $E_{260}$ nm = 5,100 which is pH independent and also based on phosphorus analysis of the polymer in water; $pK_a$ = 8.38 in a phosphate buffer solution of 0.15 ionic strength at 25°.

14. Poly-5-Chloro-2'-Chloro-2'-Deoxyuridylic Acid

Polymerization was accomplished in a similar manner to that described above. Thus, the reaction vessel contained in a total volume of 10 ml, 138 μmoles of the substrate, 4 mM $MnCl_2$, 0.1 M Tris buffer pH 9.0, 0.1 M KCl 0.4 mM EDTA and the enzyme at a concentration of 100 units/ml. The mixture was incubated at 37° and the extent of reaction followed by measurement of the inorganic phosphate released. After 48 hours at 37°, the reaction was terminated by the addition of 0.4 ml of 0.2 M EDTA. The reaction mixture was then applied to two chromatographic columns in series, 2.5 cm × 90 cm, each containing Sephadex G-50 and the columns were eluted with a solvent of 0.2 M NaCl-1 mM EDTA. The polymeric material eluted with the void volume. The pooled eluant (52 ml) containing the polymer was dialyzed against 0.2 M NaCl-1 mM EDTA. The solution remaining in the dialysis tubing was then deproteinized as described above and the aqueous layer and aqueous wash were combined and again dialyzed against water to give 68 optical density units of polymer. The aqueous solution was lyophilized to give poly-5-chloro-2'-chloro-2'-deoxyuridylic acid as a fluffy, hygroscopic powder. Poly-5-chloro-2'-chloro-2'-deoxyuridylic acid obtained in this manner had the following characteristics: $S_{20}$, 10.2 in a solution containing 1 M NaCl-phosphate buffer, pH 7.1, of ionic strength 0.05; $A_{max}$ 273.0 nm at pH 7 to pH 4; $E_{273.0}$ = 6,500 and $E_{280.0}$ = 4,950 in a solution containing 0.1 M NaCl-phosphate -phosphate buffer, pH 7.0 of ionic strength = 0.05, based on phosphorus analysis of an aqueous solution and an $E_{253.5}$ = 4,000 which is pH independent and also based on phosphorus analysis of the polymer in water; $pK_a$ = 8.29 in a phosphate buffer solution of 0.15 ionic strength at 25°.

The following Examples of 5-halogeno-2'-halogeno-2'-deoxyuridylic acids are prepared in a similar manner:

15. poly-5-fluoro-2'-fluoro-2'-deoxyuridylic acid.
16. poly-5-fluoro-2'-chloro-2'-deoxyuridylic acid.
17. poly-5-fluoro-2'-bromo-2'-deoxyuridylic acid.
18. poly-5-chloro-2'-fluoro-2'-deoxyuridylic acid.
19. poly-5-chloro-2'-bromo-2'-deoxyuridylic acid.
20. poly-5-bromo-2'-fluoro-2'-deoxyuridylic acid.
21. poly-5-bromo-2'-bromo-2'-deoxyuridylic acid.
22. poly-5-iodo-2'-fluoro-2'-deoxyuridylic acid.
23. poly-5-iodo-2'-chloro-2'-deoxyuridylic acid.
24. poly-5-iodo-2'-bromo-2'-deoxyuridylic acid.

EXAMPLE 25

Inhibition of the RNA-dependent DNA Polymerase from Avian Myeloblastosis Virus (AMV)

virus and enzyme purification.

Virus particles were concentrated by centrifugation at 60,000 ×g for 60 mins. onto 100% glycerol cushions. The virus was collected, dialyzed against buffer (0.15 M NaCl, 3 mM EDTA, 0.01 M Tris-HCl, pH 8.5), layered on a 25–60% sucrose gradient and centrifuged at 40,000 × g at 4° C for 90 mins. The visible band of virus was removed, dialyzed against 0.15 M NaCl in 0.01 M Tris-HCl, pH 8.5, and stored at −70° C in 10% glycerol.

The AMV DNA polymerase was isolated from purified virus in the following manner: The virus was disrupted by exposure to 1.0% sodium deoxycholate and 1.0% Nonidet P-40 (Shell Chemical Co.), centrifuged at 16,000 = g, and the supernatant applied to a Whatman DEAE-cellulose DE52 column. The active fractions were pooled, diluted, and applied to a Reeve Angel phosphocellulose P-11 column. The enzyme samples were stored in 2 mM dithiothreitol and 50% glycerol at −20°C.

Assay for RNA-directed DNA polymerase activity.

The polymerization of either dGMP or dTMP using the complementary primer-templates, $d(pG)_{10}$·poly(C) or $d(pT)_{10}$·poly(A) respectively, was carried out at 37° C in the following standard reaction mixture: 10 mM Tris-HCl buffer (pH 8.5); 7 mM KCl; 2 mM dithiothreitol; 10 mM $MgCl_2$; 0.6 mM dCTP or dATP; and 0.15 mM dGTP or dTTP. Tritiated dGTP or dTTP was added at a level of 0.01 uCi/ul assay mixture or approximately 20 cpm/pmole. Only the two complementary deoxynucleoside triphosphates were added to each reaction. The primer-templates were prepared in a ratio of 1:6 (w/w) unless stated otherwise.

When the polymerase activity in purified virions was assayed, the particles were first disrupted in 0.2% Nonidet P-40 at 4° C for 20 mins. and then added to the assay mixture at a level of 10 μg protein/μl.

In such experiments, 1.0 µl of enzyme solution polymerized 3.0 pmoles dGMP/min. Trichloroacetic acid insoluble product was collected and washed on nitrocellulose filters. The filters were dried, placed in a toluene-based scintillation fluid and assayed in a liquid scintillation spectrometer. Inhibition constants for the poly-5-halogeno-2'-halogeno-2'-deoxyuridylic acids were obtained from plots of [I] vs $1/V_i$, where [I] is the concentration of the inhibitor and $V_i$ is the initial velocity of the uninhibited reaction.

The inhibition constant, $K_i$, for poly-2'-fluoro-2'-deoxyuridylic acid, the reference compounds, was determined to be 40 ng/ml.

The inhibitory constant, $K_i$, of poly-5-bromo-2'-chloro-2'-deoxyuridylic acid and poly-5-chloro-2'-chloro-2'-deoxyuridylic acid were determined from a plot of [I] vs $1/V_i$ and were found to be approximately 20 ng/ml. Hence, poly-5-bromo- and poly-5-chloro-2'-chloro-2'-deoxyuridylic acids are equally potent with regard to their inhibitory powers against AMV RNA-directed DNA polymerase and are approximately twice more potent in inhibition than poly-2'-fluoro-2'-deoxyuridylic acid.

What is claimed is:

1. A compound having the formula

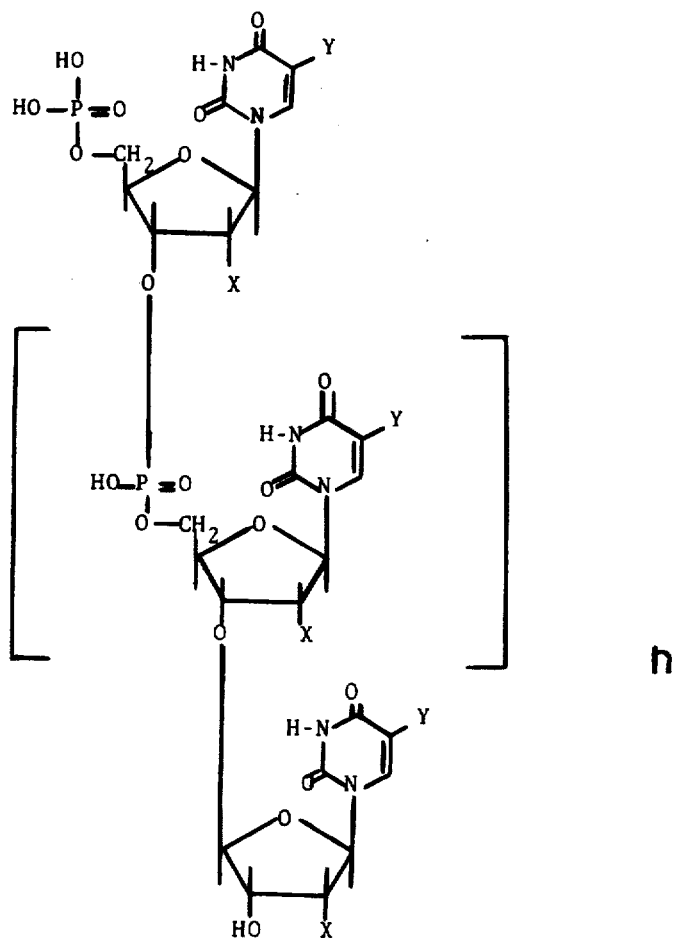

wherein:
X is selected from the group consisting of fluoro, chloro, and bromo;
Y is selected from the group consisting of fluoro, chloro, bromo, and iodo; and $n$ is an integer having a value of from zero to infinity.

2. A compound as in claim 1, poly-5-fluoro-2'-fluoro-2'-deoxyuridylic acid.

3. A compound as in claim 1, poly-5-fluoro-2'-chloro-2'-deoxyuridylic acid.

4. A compound as in claim 1, poly-5-fluoro-2'-bromo-2'-deoxyuridylic acid.

5. A compound as in claim 1, poly-5-chloro-2'-fluoro-2'-deoxyuridylic acid.

6. A compound as in claim 1, poly-5-chloro-2'-chloro-2'-deoxyuridylic acid.

7. A compound as in claim 1, poly-5-chloro-2'-bromo-2'deoxyuridylic acid.

8. A compound as in claim 1, poly-5-bromo-2'-fluoro-2'-deoxyuridylic acid.

9. A compound as in claim 1, poly-5-bromo-2'-chloro-2'deoxyuridylic acid.

10. A compound as in claim 1, poly-5-bromo-2'-bromo-2'-deoxyuridylic acid.

11. A compound as in claim 1, poly-5-iodo-2'-fluoro-2'-deoxyuridylic acid.

12. A compound as in claim 1, poly-5-iodo-2'-chloro-2'-deoxyuridylic acid.

13. A compound as in claim 1, poly-5-iodo-2'-bromo-2'-deoxyuridylic acid.

* * * * *

UNITED STATES PATENT AND TRADEMARK OFFICE
CERTIFICATE OF CORRECTION

PATENT NO. : 3,905,953

DATED : September 16, 1975

INVENTOR(S) : Michael P. Kotick; Chimanbhai P. Patel; Joseph L. Colbourn & Robert J. Erickson It is certified that error appears in the above-identified patent and that said Letters Patent are hereby corrected as shown below:

Column 9, Lines 26-62, delete the formula and substitute therefore:

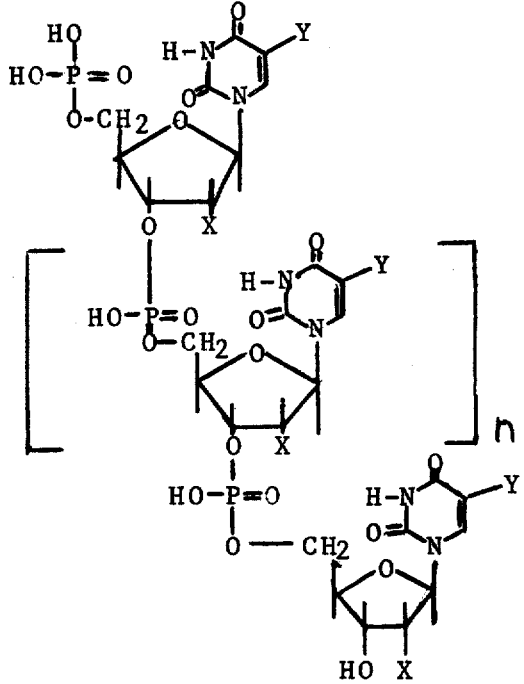

Signed and Sealed this

Fourth Day of March 1980

[SEAL]

Attest:

SIDNEY A. DIAMOND

Attesting Officer

Commissioner of Patents and Trademarks